United States Patent
Bao et al.

(10) Patent No.: US 7,418,241 B2
(45) Date of Patent: Aug. 26, 2008

(54) SYSTEM AND TECHNIQUES FOR ENHANCING THE RELIABILITY OF FEEDBACK IN A WIRELESS COMMUNICATIONS SYSTEM

(75) Inventors: Gang Bao, San Diego, CA (US); Tao Chen, San Diego, CA (US); Stein A. Lundby, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 10/216,503

(22) Filed: Aug. 9, 2002

(65) Prior Publication Data

US 2004/0203455 A1 Oct. 14, 2004

(51) Int. Cl.
| H04B 1/00 | (2006.01) |
| H04B 17/00 | (2006.01) |
| H04B 7/00 | (2006.01) |
| H04L 12/43 | (2006.01) |
| H04L 1/00 | (2006.01) |

(52) U.S. Cl. .................. 455/69; 370/458; 370/459; 370/252; 455/67.11; 455/70
(58) Field of Classification Search .............. 455/67.11, 455/67.14, 68, 69, 70, 517, 522; 370/252, 370/236, 345, 458, 459
See application file for complete search history.

(56) References Cited

U.S. PATENT DOCUMENTS 5,778,030 A 7/1998 Bruckert et al.
6,167,031 A * 12/2000 Olofsson et al. ............ 370/252
6,201,795 B1 * 3/2001 Baum et al. ................ 370/252
6,385,462 B1 * 5/2002 Baum et al. ................ 455/522
6,603,746 B1 * 8/2003 Larijani et al. ............. 370/318
6,850,498 B2 * 2/2005 Heath et al. ................ 370/328
6,859,656 B2 * 2/2005 Choi et al. .................. 455/522

FOREIGN PATENT DOCUMENTS

| EP | 0790713 A2 | 8/1997 |
| EP | 0954117 A1 | 3/1999 |
| WO | 00021235 | 3/2000 |

OTHER PUBLICATIONS

International Search Report-PCT/US03/025033, International Search Authority-European Patent Office, Jan. 16, 2004.

* cited by examiner

Primary Examiner—George Eng
Assistant Examiner—Un Cho
(74) Attorney, Agent, or Firm—Thomas R. Rouse; Kent D. Eaker; Kristine U. Ekwueme (57) ABSTRACT

Systems and techniques are disclosed relating to communications. The systems and techniques involve transmitting a signal over a plurality of time periods, receiving a plurality of parameters each relating to the signal transmission during a different one of the time periods, filtering a first one of the parameters to generate a first filtered parameter, filtering a second one of the parameters as a function of the first filtered parameter to generate a second filtered parameter, and adjusting the signal as a function of the second filtered parameter. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

31 Claims, 4 Drawing Sheets

SYSTEM AND TECHNIQUES FOR ENHANCING THE RELIABILITY OF FEEDBACK IN A WIRELESS COMMUNICATIONS SYSTEM

BACKGROUND

1. Field

The present invention relates generally to communications, and more specifically, to systems and techniques for enhancing the reliability of feedback in a wireless communications system.

2. Background

The ability of a receiver to detect a signal in the presence of noise is based on the ratio of the received signal power and the noise power. Various conventions have been developed over the years for computing this ratio. For example, the carrier-to-interference (C/I) ratio, the signal-to-noise power ratio (SNR), and the energy-per-bit-to-noise plus interference ratio ($E_b/I_o$) are just a few of many different ways to measure receiver performance. Industry usage of these terms, or similar terms, has often been interchangeable, and for the purposes of this disclosure, will have the same meaning. Accordingly, any reference to a C/I ratio will be understood by those skilled in the art to encompass the board concept of measuring the effects of noise in a wireless communications system.

In multi-access communications systems, techniques to increase bandwidth are commonly employed to maximize user capacity. For example, many transmitter designs adaptively increase the data rate to maintain the lowest C/I ratio necessary to achieve a desired quality of service. This can be achieved with what is commonly referred to as an "outer loop control" which estimates the C/I ratio at the receiver and provides feedback to the transmitter to adjust the data rate. This approach works well for receivers in close proximity to the transmitter. However, for those receivers operating at the edges of the transmitter's coverage region, a high probability exists that the estimated C/I ratio fed back to the transmitter will be corrupted resulting in an artificially high estimate. This artificially high estimate causes the transmitter to increase the data rate of the transmission beyond the capabilities of the receiver under the existing channel conditions. The problem becomes even more pronounced in communications systems in which the transmitter only receives estimates of the C/I ratio from the receiver periodically to save on overhead. In these systems, the data rate of the transmission may exceed the capabilities of the receiver for extended periods of time.

SUMMARY

In one aspect of the present invention, a method of communications includes transmitting a signal over a plurality of time periods, receiving a plurality of parameters each relating to the signal transmission during a different one of the time periods, filtering a first one of the parameters to generate a first filtered parameter, filtering a second one of the parameters as a function of the first filtered parameter to generate a second filtered parameter, and controlling the signal transmission as a function of the second filtered parameter.

In another aspect of the present invention, computer readable media embodying a program of instructions executable by a computer program performs a method of communications based on a signal transmitted over a plurality of time periods, the method including receiving a plurality of parameters each relating to the signal transmission during a different one of the time periods, filtering a first one of the parameters to generate a first filtered parameter, filtering a second one of the parameters as a function of the first filtered parameter to generate a second filtered parameter, and controlling the signal transmission as a function of the second filtered parameter.

In yet another aspect of the present invention, an apparatus includes a transceiver configured to transmit a signal over a plurality of time periods and receive a plurality of parameters each relating to the signal transmission during a different one of the time periods, and a processor having a filter configured to filter a first one of the parameters to generate a first filtered parameter and filter a second one of the parameters as a function of the first filtered parameter to generate a second filtered parameter, the processor further being configured to control the signal transmission as a function of the second filtered parameter.

In a further aspect of the present invention, an apparatus includes means for transmitting a signal over a plurality of time periods, means for receiving a plurality of parameters each relating to the signal transmission during a different one of the time periods, means for filtering a first one of the parameters to generate a first filtered parameter, means for filtering a second one of the parameters as a function of the first filtered parameter to generate a second filtered parameter, and means for controlling the signal transmission as a function of the second filtered parameter.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

Figure 1:
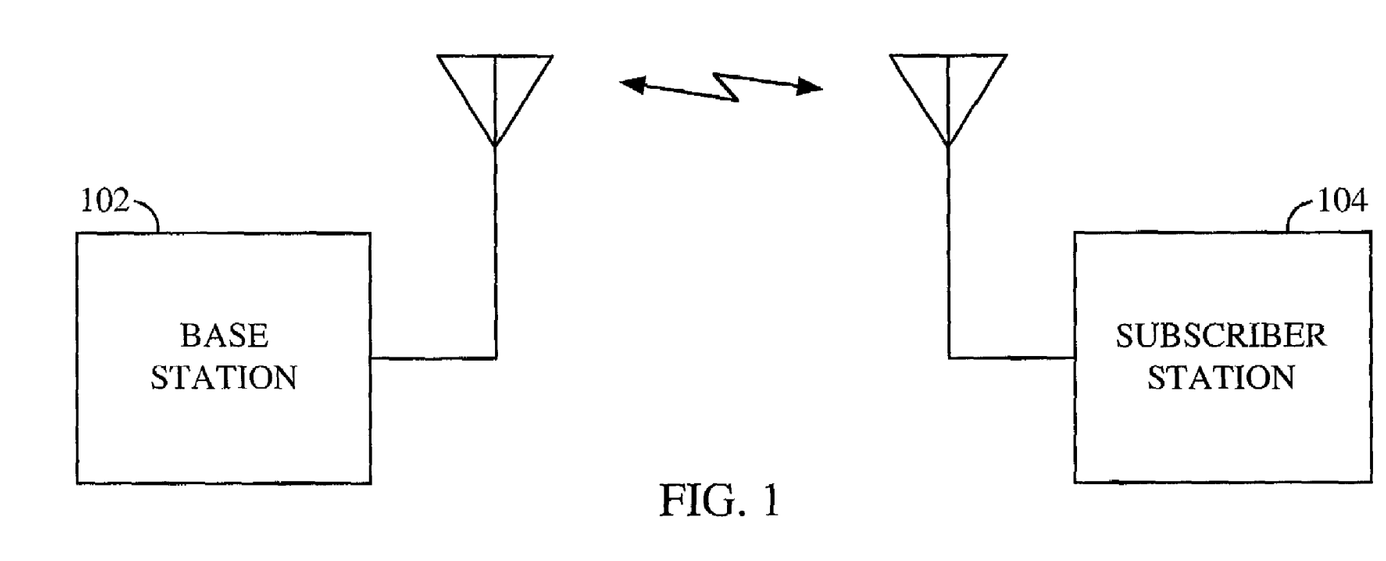
FIG. 1 is a conceptual block diagram showing a base station in communication with a subscriber station in an exemplary wireless communications system.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention FIG. 1 is a conceptual block diagram showing a base station 102 in communication with a subscriber station 104 in an exemplary wireless communications system. The subscriber station 104 may access a network (not shown), or communicate with other subscriber stations (not shown), through the base station 102. The base station 102 can be implemented with a variable data rate to ensure the transmission occurs near or at the maximum data rate that supports the minimum quality of service requirements. Initially, the subscriber station 104 establishes communication with the base station 102 using a predetermined access procedure. Once communications are established, the subscriber station 104 can receive traffic and control messages from the base station 102 over a forward link, and is able to transmit traffic and control messages to the base station 102 over a reverse link. The forward link refers to transmissions from the base station 102 to the subscriber station 104, and the reverse link refers to transmissions from the subscriber station 104 to the base station 102.

The subscriber station 104 can provide feedback to the base station 102 over the reverse link to optimize performance. The feedback can be in the form of a parameter estimated at the subscriber station 104 and fed back to the base station 102 to control the forward link transmission. The parameter should relate to the quality of the forward link transmission under existing channel conditions. The carrier-to-interference (C/I) ratio, the signal-to-noise power ratio (SNR), and the energy-per-bit-to-noise plus interference ratio ($E_b/I_o$) are common examples of such parameters. In at least one embodiment of the communications system, an estimate of the C/I ratio is fed back to the base station 102 to efficiently control the data rate of the forward link transmission. An estimate of the C/I ratio can be computed at the subscriber station from a pilot signal transmitted over the forward link. Since the pilot signal is known, a priori, an estimate of the C/I ratio can be computed from a locally generated replica of the pilot signal stored in memory (not shown) at the subscriber station 104. The estimated C/I ratio can then be digitally quantized and fed back to the base station 102.

At the base station 102, the estimated C/I ratio can be mapped to a forward link data rate using a look up table. The selection of the forward link data rate can be based on a mapping function for model channel conditions. This approach works well for forward link channel conditions which track fairly well with the model channel conditions. However, should the forward link channel conditions be different, the data rate obtained from the table may be less than optimal. For example, if the forward link channel conditions are worse than the model channel conditions, the data rate obtained from the table may be too high resulting in significant decoding errors at the subscriber station 104. Conversely, if the forward link channel conditions are better than the model channel conditions, then the data rate obtained from the table may be too low resulting in loss of valuable bandwidth. To maintain optimal performance despite varying channel conditions, additional feedback from the subscriber station 104 can be used to adjust the C/I estimate before it is mapped to a data rate. The feedback can take the form of an acknowledgement (ACK) message for each data packet of the forward link transmission that is successfully decoded by the subscriber station 104, and a negative acknowledgement (NACK) message for each data packet of the forward link transmission that is not successfully decoded by the subscriber station 104. For the purposes of this disclosure, the term "data packets" will refer to both data and voice packets depending on the particular communications application.

Figure 2:
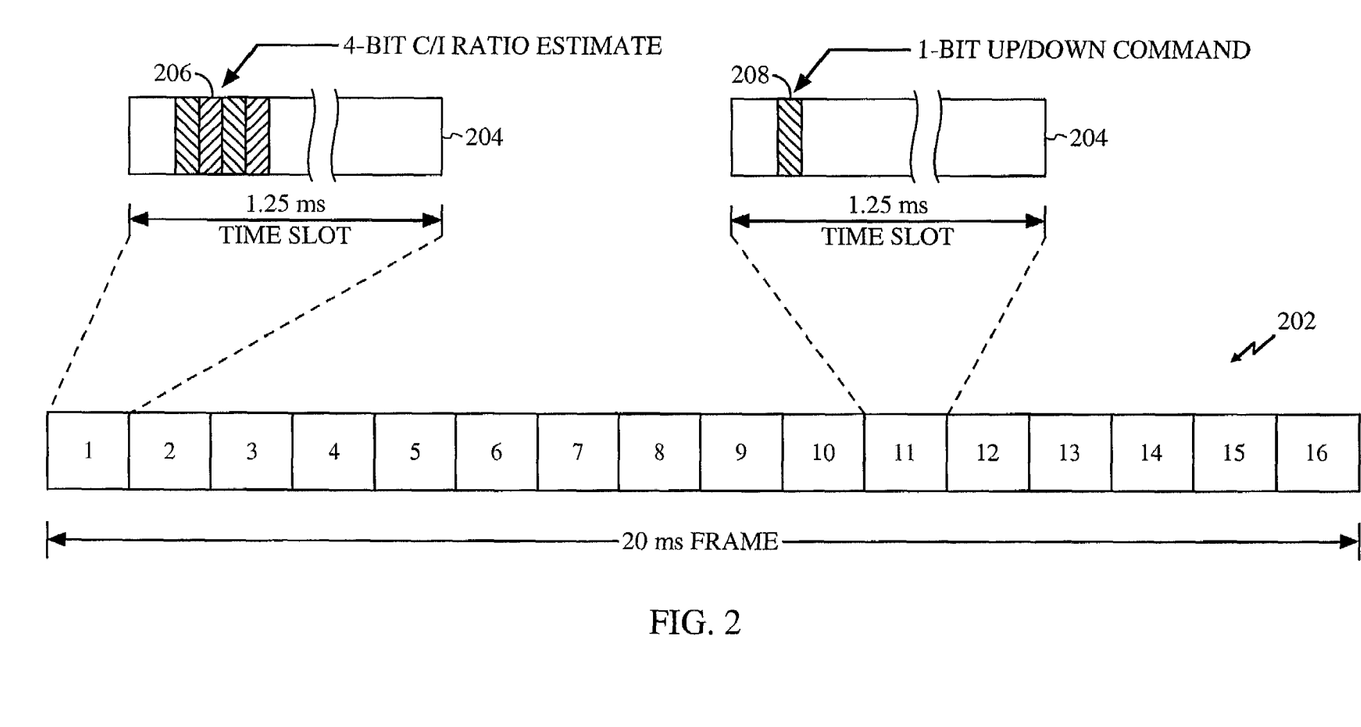
FIG. 2 is an exemplary waveform used for a reverse link transmission carrying an estimated C/I ratio from a subscriber station to a base station.

An exemplary waveform used for a reverse link transmission carrying an estimated C/I ratio is shown in FIG. 2. The waveform can be partitioned into 20 millisecond (ms) frames 202 with each frame having sixteen 1.25 ms time slots 204. For ease of explanation, the estimated C/I ratio is shown having its own control channel, however, as those skilled in the art will readily appreciate, the estimated C/I ratio may be transmitted over the reverse link in any manner depending on the communications environment, applicable industry standards, and overall design constraints. For example, the estimated C/I ratio can be punctured into one or more traffic channels. Alternatively, the estimated C/I ratio can be time division multiplexed with other overhead signals such as the reverse link pilot signal. Time division multiplexing the estimated C/I ratio with the reverse link pilot signal may be advantageous in spread spectrum communications such as code division multiple access (CDMA) systems which utilize Walsh functions for channel separation. In these systems, a Walsh ($W_0$) code consisting of all zeros is typically assigned to the pilot channel to avoid modulating the pilot signal. By transmitting the estimated C/I ratio on the pilot channel, processing delays associated with demodulation can be eliminated. Each estimated C/I ratio is typically represented by several bits. Using more bits to represent the estimated C/I ratio allows for more selectable data rates at the base station. In order to reduce overhead, an estimated C/I ratio is generally not transmitted in every time slot. Instead, an estimated C/I ratio 206 is transmitted in just one time slot of each frame followed by an up/down bit 208 in each of the following fifteen time slots.

Figure 3:
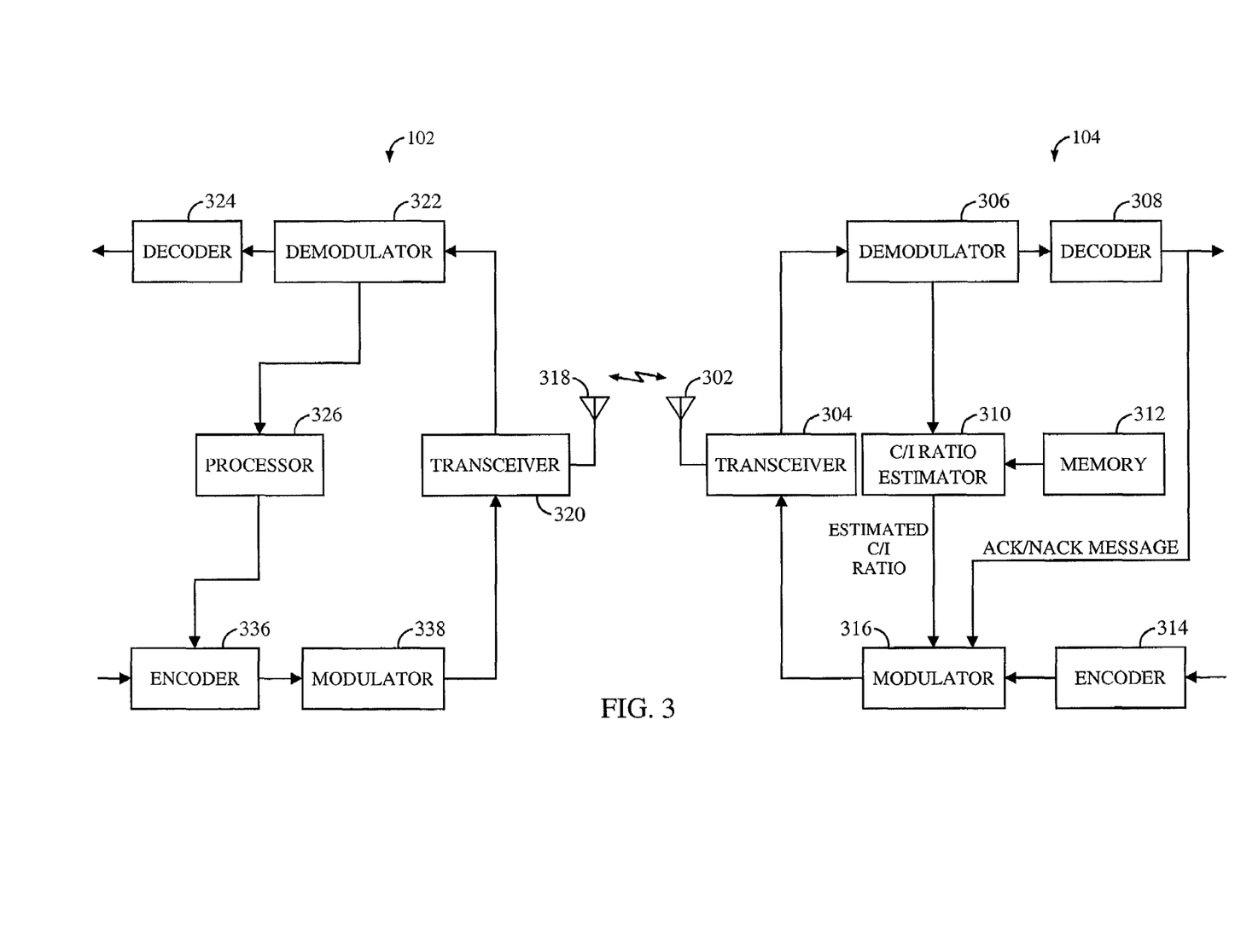
FIG. 3 is a functional block diagram of the exemplary base station and subscriber station described in connection with FIG. 1.

FIG. 3 is a functional block diagram of the exemplary base station and subscriber station described in connection with FIG. 1. The subscriber station 104 typically includes an antenna 302 which couples the forward link transmission propagated in free space to a transceiver 304. The transceiver 304 can be configured to filter and amplify the forward link transmission, and downconvert it to a modulated baseband signal. A demodulator 306 can be used to generate soft symbol estimates from the modulated signal. The soft symbol estimates can be coupled to a decoder 308 for forward error correction before hard symbol estimates are made downstream. An ACK or NACK message can be generated by the decoder 308 to indicate whether each data packet of soft symbol estimates has been successfully decoded.

The forward link pilot signal is typically not encoded, and therefore, the soft symbol estimates generated from the pilot signal can be coupled directly from the demodulator 306 to a C/I ratio estimator 310. Since the pilot symbol sequence is known, a priori, it can be stored in memory 312 at the subscriber station 104. Based on the soft symbol estimates from the forward link pilot signal and the pilot symbol sequence stored in memory 312, the C/I ratio estimator 310 can compute an estimated C/I ratio and digitally quantize the result. The C/I computation can be performed by any means known in the art including a mean square error (MSE) algorithm or any other applicable algorithm.

An encoder 314 can be used to perform various signal processing functions on one or more traffic channels, such as convolutional encoding and interleaving. For each time slot, traffic from the encoder 314 together with the ACK or NACK message from the decoder 308 can be provided to the modulator 316. In addition, the estimated, C/I ratio from the C/I ratio estimator 310 can be provided to the modulator 316 during one time slot in each frame. An up/down command can be generated by the C/I ratio estimator 310 for each of the following fifteen time slots and provided to the modulator 316. The estimated C/I ratio (or the up/down command) and ACK or NACK message can be placed on the appropriate channels and combined with the traffic channels by means well known in the art. Alternatively, one or both of the estimated C/I ratio (or the up/down command) and the ACK or NACK message can be punctured into one or more of the traffic channels. In any event, the various channels can be combined and modulated by means well known in the art and provided to the transceiver 304 for upconversion, filtering and amplification before being transmitted over the reverse link through the antenna 302.

The reverse link signal can be received by an antenna 318 at the base station 102 and provided to a transceiver 320. The transceiver 320 can provide filtering and amplification of the reverse link transmission, as well as downconversion to a modulated baseband signal. A demodulator 322 can be used to demodulate the baseband signal. The demodulated signal can be provided to a decoder 324 which performs the inverse of the signal processing functions done at the subscriber station 104, specifically the de-interleaving and decoding.

A processor 326 can be configured to perform numerous functions. In the exemplary communications system described thus far, the processor 326 can be used to determine the data rate of the forward link transmission based on the estimated C/I ratio and the up/down commands reported back to the base station from the subscriber station. During the appropriate time slot for each frame, the estimated C/I ratio can be extracted from the demodulated signal and provided to the processor 326. The estimated C/I ratio is transmitted over the reverse link without encoding or interleaving to minimize processing delays at the base station 102.

The processor 326 can be used to control the data rate of an encoder 336. The encoder 336 performs various signal processing functions on one or more traffic channels such as convolutional encoding at the data rate set by the processor 326 and interleaving. The traffic from the encoder 336 can be provided to a modulator 338 where it is combined with other overhead channels and modulated. The modulated signal can be provided to the transceiver 320 for upconversion, filtering and amplification before being transmitted over the forward link through the antenna 318.

Figure 4:
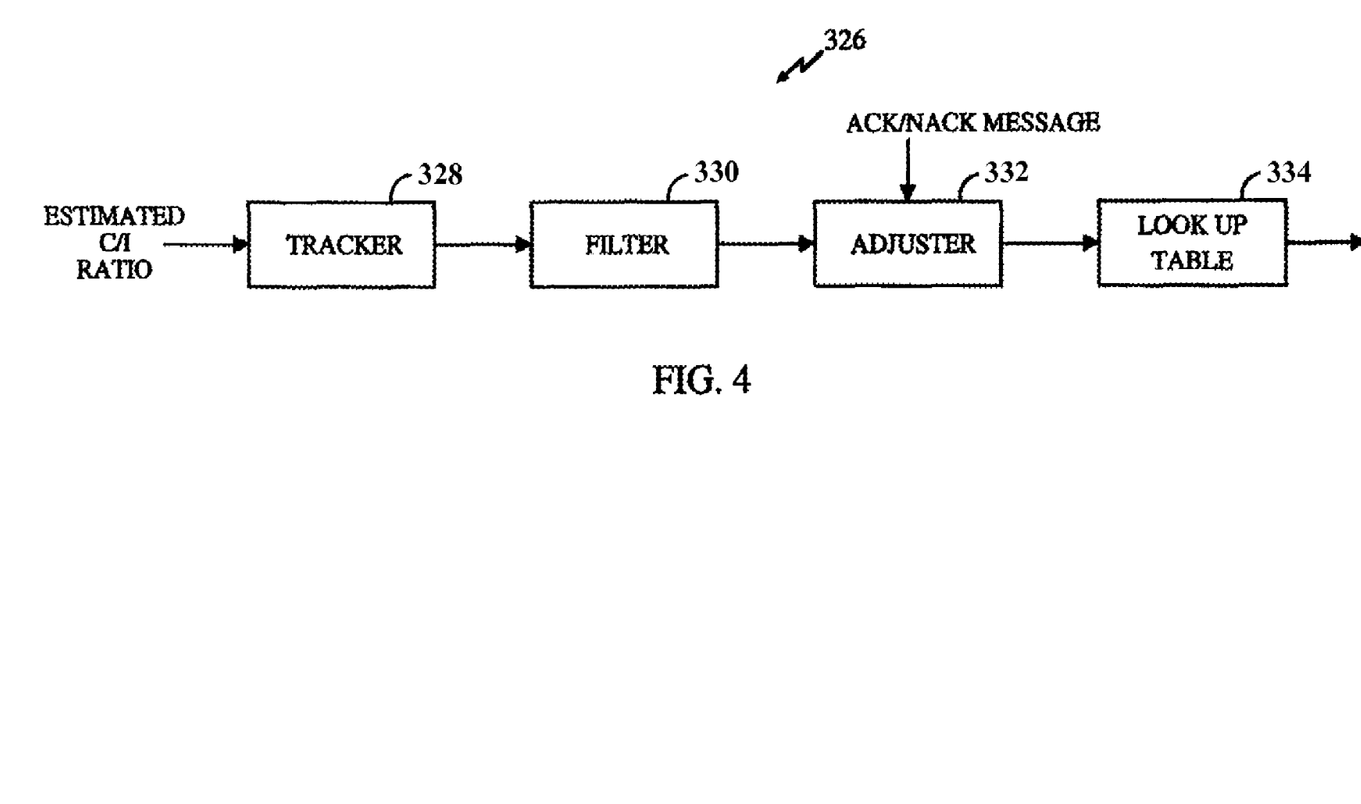
FIG. 4 is a functional block diagram of an exemplary processor for the base station described in connection with FIG. 3.

FIG. 4 is a functional block diagram of an exemplary processor for computing the data rate of the encoder. The estimated C/I ratio extracted from the demodulated signal can be provided to a tracker 328. The tracker 328 may include memory (not shown) for updating the estimated C/I ratio once every frame and a tracking function for incrementing or decrementing the estimated C/I ratio stored in memory in accordance with the up/down commands received from the subscriber station 104 in the following fifteen time slots. The tracking function allows the estimated C/I ratio to be mapped to a data rate via a look up table 334 every time slot.

The estimated C/I ratio from the tracker 402 can be adjusted before it is mapped to a data rate. An adjuster 406 can be used to adaptively compensate the estimated C/I ratio for changing channel conditions by incrementing or decrementing the estimated C/I ratio in response to the ACK and NACK messages. For example, if the channel conditions become worse than the model channel conditions used to generate the mapping function, the adjuster 406 may select a more conservative data rate for a given estimated C/I ratio by decrementing the estimate before providing it to the look up table 408. The selection of a more conservative data rate can be triggered by an unusually high number of NACK messages being reported back to the base station from the subscriber station. Conversely, should the channel conditions become better than the model channel conditions of the mapping function, the adjuster 406 may select a more aggressive data rate for a given estimated C/I ratio by incrementing the estimate before providing it to the look up table 408. The selection of a more aggressive data rate can be triggered by an unusually high number of ACK messages being reported back to the base station from the subscriber station.

To conserve bandwidth, the look-up table 408 typically provides a thresholding function which prevents forward link transmissions when the estimated C/I ratio is too low. Unfortunately, this thresholding function can sometimes shrink the geographic coverage region of the base station. As explained earlier, a subscriber station operating at the edges of the base station's coverage region has a high probability that the estimated C/I ratio will be corrupted when it arrives at the base station resulting in an artificially high estimate. This artificially high estimate tends to increase the data rate of the forward link transmission beyond the subscriber station's capability under the existing channel conditions resulting in an unusually high number of NACK messages being reported back to the base station. As the number of NACK messages increase, the adjuster 406 decreases the estimated C/I ratio until it falls below the threshold. In other words, corrupted C/I ratio estimates received by the base station from a subscriber station operating at the edges of the coverage region not only result in a data rate that cannot be supported by the subscriber station, but may also result in the complete loss of the forward link transmission due to an abundantly high number of NACK messages which tend to drive the estimated C/I ratio below the threshold needed to support a forward link transmission.

To prevent the complete loss of the forward link transmission under these conditions, the adjuster 406 can be configured to control the manner in which the estimated C/I ratio is reduce in response to NACK messages. For example, the adjuster 406 can be configured to decrease the estimated C/I ratio only if the NACK message is both preceded and followed by an ACK message. In this configuration, the adjuster 406 will not respond to two or more consecutive NACK messages, which is characteristic of a subscriber station operating at the edges of the base station's coverage region. Of course, those skilled in the art will be readily able to devise other algorithms for manipulating the NACK messages to prevent the loss of the forward link transmission.

A filter 404 can also be positioned in front of the adjuster 406 to prevent abrupt changes in the C/I ratio estimate from killing the forward link transmission. The filter can be implemented in a variety of ways depending on the particular communications environment and the overall design constraints of the system, as well as other known considerations. For example, the filter 404 can be implemented with an algorithm that limits the maximum change in the estimated C/I ratio from one time period to the next time period. The tent "time period" is used broadly to define any period of time. The time periods can divide up a continuous transmission or define a burst transmission. Alternatively, the time periods can divide up each burst transmission in a series of transmissions. In most cases, the time period will take on some convenient value based on the design parameters of the communications system. For example, in the exemplary communications system described thus far, the time period of the filter 404 can be conveniently set to one time slot because of the tracking function. Alternatively, the time period of the filter 404 could be set for a portion of one time slot, multiple time slots, one frame, multiple frames, or any other convenient measure of time.

The filter 404 can be implemented with various algorithms to prevent abrupt changes in the estimated C/I ratio. For example, an algorithm can be used to limit the maximum change in the estimated C/I ratio to a threshold value. The threshold value can be static, or alternatively, can be adaptively adjusted to optimize performance under changing channel conditions. An exemplary algorithm using a static threshold can be expressed as follows:

$$X(t)=Y(t) \text{ if } |Y(t)-X(t-1)|<T \text{ dB}$$

$$X(t)=X(t-1)+T \text{ if } [Y(t)-X(t-1)]>T \text{ dB}$$

$$X(t)=X(t-1)-T \text{ if } [Y(t)-X(t-1)]<-T \text{ dB}$$

where: X(t) is the estimated C/I ratio output from the filter for time slot t;
 Y(t) is the estimated C/I ratio input to the filter for time slot t;
 X(t−1) is the estimate C/I ratio output from the filter for the previous time slot; and
 T is the threshold in dB.

An exemplary algorithm using an adaptive threshold can be expressed as follows:

$$X(t) = Y(t) \text{ if } \left|Y(t) - \frac{1}{N}\sum_{k=1}^{N} X(t-k)\right| < a\sigma(t-1)$$

$$X(t) = \frac{1}{N}\sum_{k=1}^{N} X(t-k) + a\sigma(t-1) \text{ if } Y(t) - \frac{1}{N}\sum_{k=1}^{N} X(t-k) > a\sigma(t-1)$$

$$X(t) = \frac{1}{N}\sum_{k=1}^{N} X(t-k) - a\sigma(t-1) \text{ if } Y(t) - \frac{1}{N}\sum_{k=1}^{N} X(t-k) < -a\sigma(t-1)$$

where: X(t) is the estimated C/I ratio output from the filter for time slot t;
 Y(t) is the estimated C/I ratio input to the filter for time slot t;

$$\frac{1}{N}\sum_{k=1}^{N} X(t-k)$$

is the mean of the estimated C/I ratios output from the filter computed over N number of previous time slots;
 σ(t−1) is the standard deviation of the estimated C/I ratios output from the filter computed over the N number of previous time slots; and
 a is a constant.

With this algorithm, any number N of previous filtered estimates can be used to generate a mean value. An adaptive threshold can then be set to limit the maximum change in the estimated C/I ratio from the mean to one or more multiples of the standard deviation. This approach provides an adaptive threshold that decreases if the estimated C/I ratios are tightly clustered around the mean and increases if the estimated C/I ratios are widely scattered about the mean. Of course, other algorithms may be used depending on the particular communications application and overall design constraints. Those skilled in the art will be readily able to derive such algorithms based on the teachings of this disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications, comprising:
 transmitting a signal on a forward link of a communication channel, wherein the signal is transmitted over a plurality of time periods;
 receiving a plurality of feedback parameters on a reverse link of the communication channel that describe the quality of the signal transmitted on the forward link and correspond to the plurality of the time periods of the communication channel;
 filtering one of the feedback parameters at a first time period from the plurality of time periods to generate a first filtered parameter;
 filtering another of the feedback parameters at a second time period from the plurality of time periods to generate a second filtered parameter, wherein the second time period being proximal in time from the first time period; and
 generating a control signal as a function of the difference between the first and second filtered parameters;
 filtering a next feedback parameter from the plurality of feedback parameters received at a time period proximal in time from the second time period; and
 updating the control signal as a function of the next filtered parameter and at least one packet acknowledgement indicator, wherein the update is limited to a maximum difference between the second and the next filtered parameters.

2. The method of claim 1 wherein each of the plurality of feedback parameters relates to a carrier-to-interference ratio of the signal transmission over the communication channel during each of the plurality of time periods.

3. The method of claim 2 further comprising receiving feedback messages reporting channel conditions of the communications channel, and the generating the control signal further including adjusting the control signal based on the feedback messages.

4. The method of claim 3 wherein the generating a control signal further including generating the control signal controlling the data rate of the communications channel.

5. The method of claim 1 wherein the generating the control signal further comprising including the first filtered parameters as the control signal if the difference is within a predetermined threshold, and including the second parameter offset by the threshold as the control signal if the difference exceeds the predetermined threshold.

6. The method of claim 1 wherein the filtering of the other of the parameters further comprising filtering a group of parameters proximal in time with the second time period, and thereafter computing a means from the group of parameters.

7. The method of claim 6 further comprising computing a standard deviation from the group of parameters.

8. A computer-readable storage medium encoded with a computer-readable program of instructions for:
  transmitting a signal on a forward link of a communication channel, wherein the signal is transmitted over a plurality of time periods;
  receiving a plurality of feedback parameters on a reverse link of the communication channel that describe the quality of the signal transmitted on the forward link and correspond to the plurality of the time periods of the communication channel;
  filtering one of the feedback parameters at a first time period from the plurality of time periods to generate a first filtered parameter,
  filtering another of the feedback parameters at a second time period from the plurality of time periods to generate a second filtered parameter, wherein the second time period being proximal in time from the first time period; and
  generating a control signal as a function of the difference between the first and second filtered parameters;
  filtering a next feedback parameter from the plurality of feedback parameters received at a time period proximal in time from the second time period; and
  updating the control signal as a function of the next filtered parameter and at least one packet acknowledgment indicator, wherein the update is limited to a maximum difference between the second and the next filtered parameters.

9. A computer-readable storage medium of claim 8 wherein each of the plurality of feedback parameters relates to a carrier-to-interference ratio of the signal transmission over the communication channel during each of the plurality of time periods.

10. A computer-readable storage medium of claim 9 further comprising instructions for receiving feedback messages reporting channel conditions of the communications channel, and the generating the control signal further including adjusting the control signal based on the feedback messages.

11. A computer-readable storage medium of claim 10 wherein the generating a control signal farther including generating the control signal controlling the data rate of the communications channel.

12. A computer-readable storage medium of claim 8 wherein the generating the control signal farther comprising including the first filtered parameters as the control signal if the difference is within a predetermined threshold, and including the second parameter offset by the threshold as the control signal if the difference exceeds the predetermined threshold.

13. A computer-readable storage medium of claim 8 wherein the filtering of the other of the parameters farther comprising filtering a group of parameters proximal in time with the second time period, and thereafter computing a means from the group of parameters.

14. A computer-readable storage medium of claim 13 further including instructions for computing a standard deviation from the group of parameters.

15. An apparatus, comprising:
  a transceiver configured to transmit a signal on a forward link of a communication channel, wherein the signal is transmitted over a plurality of time periods and receive a plurality of feedback parameters on a reverse link of the communication channel that describe the quality of the signal transmitted on the forward link and correspond to the plurality of the time periods of the communication channel; and
  a processor having a filter configured to filter one of the feedback parameters at a first time period from the plurality of time periods to generate a first filtered parameter, and to filter another of the feedback parameters at a second time period from the plurality of time periods to generate a second filtered parameter, wherein the second time period being proximal in time from the first time period, said processor being further configured to generate a control signal as a function of the difference between the first and second filtered parameters, filter a next feedback parameter from the plurality of feedback parameters received at a time period proximal in time from the second time period, and update the control signal as a function of the next filtered parameter and at least one packet acknowledgment indicator, wherein the update is limited to a maximum difference between the second and the next filtered parameters.

16. The apparatus of claim 15 wherein each of the plurality of feedback parameters relates to a carrier-to-interference ratio of the signal transmission over the communication channel during each of the plurality of time periods.

17. The apparatus of claim 16 wherein the transceiver farther being configured to receive feedback messages reporting channel conditions of the communications channel, and the processor being further to configured to generate the control signal based on the feedback messages.

18. The apparatus of claim 17 wherein the control signal farther including a signal controlling the data rate of the communications channel.

19. The apparatus of claim 15 wherein the control signal farther comprising including the first filtered parameters as the control signal if the difference is within a predetermined threshold, and including the second parameter offset by the threshold as the control signal if the difference exceeds the predetermined threshold.

20. The apparatus of claim 15 wherein the processor being farther configured to filter a group of parameters proximal in time with the second time period, and thereafter to compute a means from the group of parameters.

21. The apparatus of claim 20 further configured to compute standard deviation from the group of parameters.

22. An apparatus, comprising:
- means for transmitting a signal on a forward link of a communication channel, wherein the signal is transmitted over a plurality of time periods;
- means for receiving a plurality of feedback parameters on a reverse link of the communication channel that describe the quality of the signal transmitted on the forward link and correspond to the plurality of the time periods of the communication channel;
- means for filtering one of the feedback parameters at a first time period from the plurality of time periods to generate a first filtered parameter,
- means for filtering another of the feedback parameters at a second time period from the plurality of time periods to generate a second filtered parameter, wherein the second time period being proximal in time from the first time period; and
- means for generating a control signal as a function of the difference between the first and second filtered parameters;
- means for filtering a next feedback parameter from the plurality of feedback parameters received at a time period proximal in time from the second time period; and
- means for updating the control signal as a function of the next filtered parameter and at least one packet acknowledgement indicator, wherein the update is limited to a maximum difference between the second and the next filtered parameters.

23. The apparatus of claim 22 wherein each of the plurality of feedback parameters relates to a carrier-to-interference ratio of the signal transmission over the communication channel during each of the plurality of time periods.

24. The apparatus of claim 23 further comprising means for receiving feedback messages reporting channel conditions of the communications channel, and the means for generating the control signal further including means for adjusting the control signal based on the feedback messages.

25. The apparatus of claim 24 wherein the means for generating a control signal farther including means for generating the control signal controlling the data rate of the communications channel.

26. The apparatus of claim 22 wherein the means for generating the control signal farther comprising means for including the first filtered parameters as the control signal if the difference is within a predetermined threshold, and including the second parameter offset by the threshold as the control signal if the difference exceeds the predetermined threshold.

27. The apparatus of claim 22 wherein the means for filtering of the other of the parameters further comprising means for filtering a group of parameters proximal in time with the second time period, and thereafter computing a means from the group of parameters.

28. The apparatus of claim 27 further comprising means for computing a standard deviation from the group of parameters.

29. An apparatus, comprising:
- a transceiver configured to receive a signal on a forward link of a communication channel, wherein the signal is transmitted over a plurality of time periods and transmit a plurality of feedback parameters on a reverse link of the communication channel that describe the quality of the signal transmitted on the forward link and correspond to the plurality of the time periods of the communication channel; and
- a quality measure estimator configured to generate the plurality of feedback parameters, including a first feedback parameter corresponding to a first time period, and a second feedback parameter corresponding to a second time period, and wherein a difference between the first and second feedback parameters is used to generate a control signal, the control signal being updated as a function of a next filtered parameter received at a time period proximal in time from the second time period and at least one packet acknowledge indicator, and wherein the update is limited to a maximum difference between the second and next filtered parameter.

30. The apparatus of claim 29, wherein the maximum change in the first feedback parameter corresponds to a threshold value.

31. A method, comprising:
- receiving a signal on a forward link of a communication channel, wherein the signal is transmitted over a plurality of time periods;
- transmitting a plurality of feedback parameters on a reverse link of the communication channel that describe the quality of the signal transmitted on the forward link and correspond to the plurality of the time periods of the communication channel;
- generating a first feedback parameter corresponding to a first of the time periods;
- generating a second feedback parameter corresponding to a second of the time periods; and
- generating a control signal as a function of a difference between the first and second feedback parameters;
- filtering a next feedback parameter from the plurality of feedback parameters received at a time period proximal in time from the second time period; and
- updating the control signal as a function of the next filtered parameter and at least one packet acknowledgment indicator, wherein the update is limited to a maximum difference between the second and the next filtered parameters.

* * * * *